United States Patent
Campau et al.

(10) Patent No.: US 6,206,482 B1
(45) Date of Patent: Mar. 27, 2001

(54) ELECTRONIC BRAKE MANAGEMENT SYSTEM WITH A SIGNAL MODULATION CONTROLLER AND A BRUSHLESS MOTOR

(75) Inventors: Gregory P. Campau, Plymouth; Mark S. Luckevich, Ann Arbor; Edward R. Hornback, Dexter; John D. Cotner, Ypsilanti; Clark E. Lowman, Ann Arbor, all of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/431,866

(22) Filed: Nov. 2, 1999

Related U.S. Application Data

(63) Continuation of application No. PCT/US98/08137, filed on Apr. 23, 1998.
(60) Provisional application No. 60/045,731, filed on May 6, 1997.

(51) Int. Cl.$^7$ ..................................................... B60T 13/00
(52) U.S. Cl. .................................. 303/20; 303/3; 303/15
(58) Field of Search ................................ 303/3, 20, 155, 303/156, 199; 364/426.01

(56) References Cited

U.S. PATENT DOCUMENTS

| | | |
|---|---|---|
| 4,824,188 | 4/1989 | Hatch . |
| 5,320,421 * | 6/1994 | Kade et al. ................ 303/115.2 |
| 5,360,322 | 11/1994 | Henein et al. . |
| 5,475,596 | 12/1995 | Henry et al. . |
| 5,531,509 | 7/1996 | Kellner et al. . |
| 5,700,072 | 12/1997 | Cook et al. . |
| 5,788,341 | 8/1998 | Penrod et al. . |
| 5,823,640 * | 10/1998 | Eichhorn et al. ............ 303/119.2 |
| 5,941,608 * | 8/1999 | Campau et al. ............. 303/113.4 |
| 6,019,441 * | 2/2000 | Lloyd et al. ................ 303/156 |

FOREIGN PATENT DOCUMENTS

| | | |
|---|---|---|
| 42 31 784 A1 | 3/1994 | (DE) . |
| 2 655 933 A1 | 6/1991 | (FR) . |
| WO/96 39318 A1 | 12/1996 | (WO) . |

OTHER PUBLICATIONS

SGS–Thomson Microelectronics, Automotive Products Databook $2^{nd}$ Edition, Jan. 1993, pp. 75–85.
Motorola, Linear/Interface Ics Device Data, vol. 1, DL 128/D Rev. 4, Series H, First Printing 1993, pp. 4–4, 4–5, 4–36 through 4–78.

* cited by examiner

*Primary Examiner*—Chris Schwartz
(74) *Attorney, Agent, or Firm*—MacMillan, Sobanski & Todd, LLC

(57) ABSTRACT

An electronic brake management system for controlling the application of fluid pressure to the brakes associated with wheels on a vehicle is disclosed. The system comprises a plurality of hydraulic valves for controlling the application of fluid to the brakes and a plurality of valve drivers for controlling the valves in accordance with respective electrical control signals for the plurality of valves. The system further includes a valve pulse width modulation controller for generating the respective electrical valve control signals applied to the valve drivers. The electrical valve control signals from the pulse width modulation controller are modulated to reduce the amount of electrical power supplied by the individual ones of the electrical signals once the valve associated with the one of the electrical signals has changed its opening to a desired position. The system further includes a brushless motor for driving a hydraulic pump for supplying fluid to the brakes in accordance with a pulse width modulated motor control signal from a motor signal modulation controller. The brushless motor provides a feedback signal to the motor signal modulation controller which is indicative of the position of the brushless motor rotor.

16 Claims, 2 Drawing Sheets

ELECTRONIC BRAKE MANAGEMENT SYSTEM WITH A SIGNAL MODULATION CONTROLLER AND A BRUSHLESS MOTOR

CROSS-REFERENCE TO RELATED APPLICATIONS

This application is a Continuation of copending International Application PCT/US98/08137 filed on Apr. 23, 1998 and which designated the U.S. and which was a Continuation of U.S. Provisional Application Ser. No. 60/045,731, filed May 6, 1997.

BACKGROUND OF THE INVENTION

The present invention relates generally to brake management systems, and more particularly to an electronic brake management system for controlling the hydraulics for vehicle brakes.

SUMMARY OF THE INVENTION

Briefly, the present invention comprises an electronic brake management system for controlling the application of brakes to wheels on a vehicle. The system comprises a plurality of hydraulic valves for controlling the application of brakes to the wheels on the vehicle; a plurality of valve drivers for controlling the valves in accordance with respective electrical valve control signals for the plurality of valves; a valve signal modulation controller for applying the electrical valve control signals to the valve drivers, wherein the electrical valve control signals are modulated to reduce the amount of electrical power supplied by a given one of the electrical valve control signals once the valve associated with the given one of the electrical valve control signals has changed its opening to a desired position. This invention further includes a motor signal modulation controller for generating a motor speed control signal, and a brushless motor for driving a hydraulic pump for supplying fluid to the brakes in accordance with the motor speed control signal from the motor signal modulation controller. The brushless motor provides a feedback signal to the motor signal modulation controller indicative of the position of the brushless motor rotor. Accordingly, the motor signal modulation controller controls the speed of the brushless motor via the motor position control signal and an internal algorithm.

In a preferred embodiment of the present invention, the valve signal modulation controller comprises a pulse width modulator. Likewise, in a preferred embodiment of the present invention the motor signal modulation controller is comprised of a pulse width modulator.

In a further aspect of the present invention, the brushless motor may be comprised of a DC brushless motor or a switched reluctance motor.

In a yet further aspect of the present invention, the brake management system may include at least one proportional valve, with at least one proportional valve driver for controlling the at least one proportional valve. The system further includes a proportional valve signal modulation controller for generating a proportional valve control signal to control the at least one proportional valve driver.

In a further aspect of the present invention, the plurality of valve drivers include structure to generate feedback signals to the valve signal modulation controller, which feedback signals are indicative of the electrical control signals applied to the valves.

In a yet further aspect of the present invention, a method is disclosed for controlling the application of brake fluid pressure to brakes associated with wheels on a vehicle, comprising the steps of: controlling hydraulic valves that apply brake fluid pressure to respective brakes in accordance with respective modulated valve control signals; controlling the speed of a brushless motor that drives a hydraulic pump for supplying the fluid pressure to the brakes in accordance with a motor position control signal; and generating the motor speed control signal in accordance with a feedback signal indicative of the position of the brushless motor and in accordance with an internal algorithm.

In a preferred embodiment of the present inventive method, the motor speed control generating step comprises a step of generating a pulse width modulated signal, as the motor speed control signal. Further, the step of controlling the hydraulic valves comprises the step of generating a pulse width modulated signal as the modulated valve control signal.

DETAILED DESCRIPTION OF THE PREFERRED EMBODIMENTS

Figure 1:
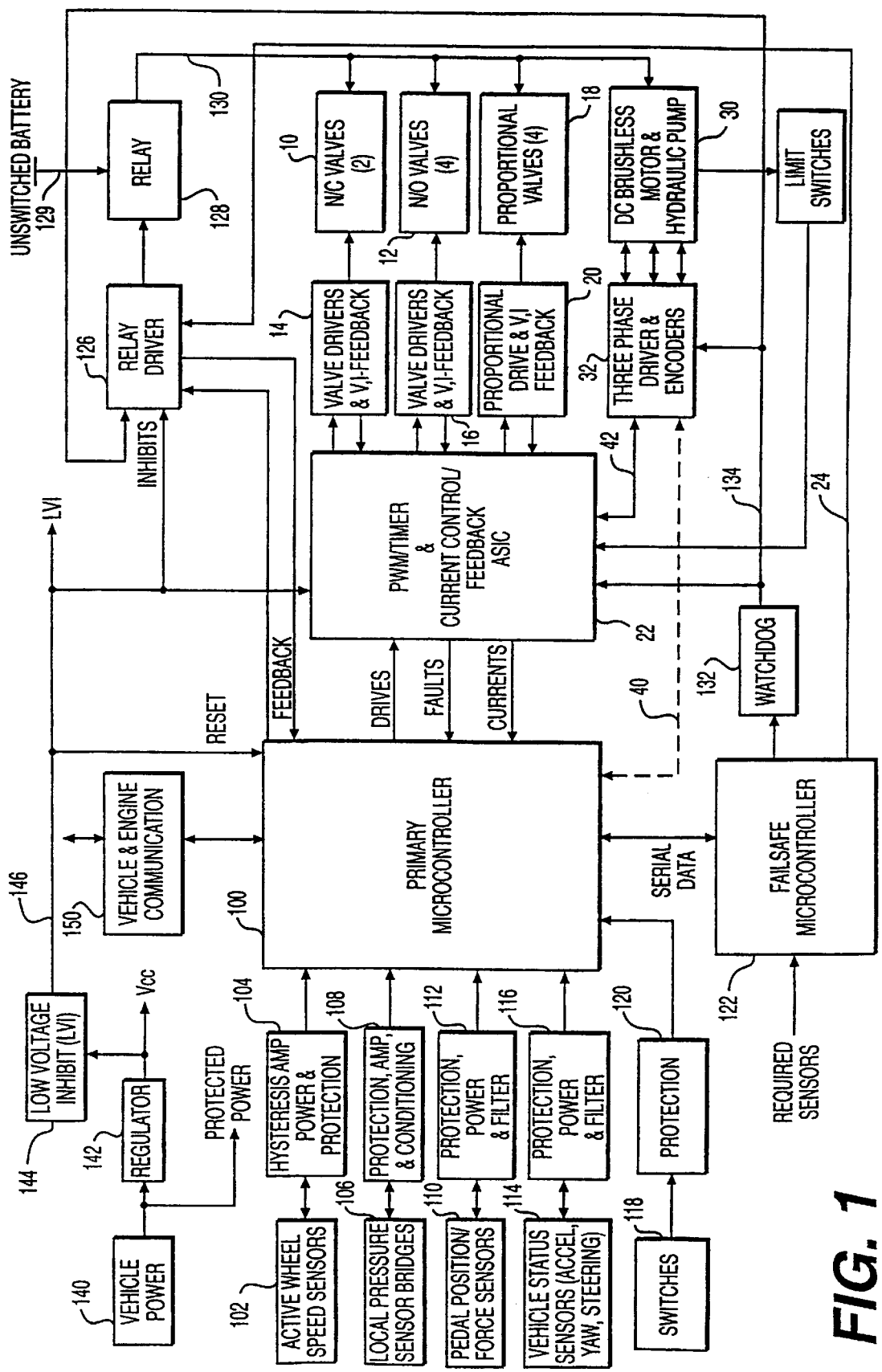
FIG. 1 is a schematic block diagram of a preferred embodiment of the present invention.

Referring now to FIG. 1, there is shown an overall electronic brake management diagram which includes, as a portion thereof, the present invention. The system comprises a plurality of hydraulic valves 10 and 12 for controlling the application of fluid pressure to brakes associated with wheels on a vehicle. The valves may comprise a valve housing and moving valve parts controlled by a solenoid. Some of these valves, represented by block 10, are normally closed (N/C) valves. Another group of valves, represented by block 12, are normally open (N/O) valves. The normally closed valves 10 are driven by a plurality of valve drivers 14 which control the valves in accordance with electrical control signals applied to the individual valves thereof. Likewise, the normally open valves 12 have associated therewith a plurality of valve drivers 16 for controlling these normally open valves in accordance with electrical control signals for the individual valves. The valve drivers may typically be implemented as semiconductor devices, e.g., BJT's or FET's.

Additionally, the system may include proportional valves 18 and proportional valve drivers 20 for controlling the proportional valves.

The control signals for controlling the valve drivers 14 and 16 and the proportional drivers 20 are generated in a valve signal modulation controller 22. The signals generated by the valve signal modulation controller 22 to control the valve drivers 14 and 16 are modulated to reduce the amount of electrical power supplied by individual ones of the electrical signals once the valve associated with a given valve driver has changed its opening to a desired position.

In prior art systems, valves were normally opened or closed based on a constant current or constant voltage control signal. Initially, a large amount of current is required in order to open or close the valve. However, a lower current, referred to as the hold-in current, is required to maintain the valve in position once it's opening has been changed. All of the electrical energy used after the valve has moved is dissipated as heat.

The present design ensures that $I^2R$ losses will not exceed a maximum amount that will burn out the valve assemblies, which are typically implemented using solenoids. The present invention is designed to maximize the current applied initially to the valve to either open or close the valve, or otherwise change its position. Then, the control current is modulated to reduce the current to thereby minimize the dissipation of electrical energy in the valve, i.e., to minimize the valve heating.

There are a variety of ways to implement a valve signal modulation controller 22. In a preferred embodiment, the valve signal modulation controller 22 is implemented by means of a pulse width modulator and timer which operates by changing or modulating the duty cycle for the valve control signals. In a preferred embodiment, the pulse width modulator operates to modulate a signal with pulses of a duty cycle (typically 100% duty cycle or full on) to yield an initial pull-in current of, by way of example, three amperes, for approximately one second in order to change the position of the valve to a desired position. Then, the pulse width modulator 22 generates via pulses of a shorter duty cycle a current control hold-in signal on the order of, by way of example, one ampere.

Such a pulse width modulation circuit may be implemented, in one embodiment, by creating a triangular waveform in an oscillator, and providing that triangular waveform as one input to a comparator. The other input to the comparator is a reference signal. This configuration permits the generation of different pulse widths. The pulse widths are varied by moving the reference voltage signal up or down in value. The comparator then generates a pulse width which varies in accordance with the variation of the reference voltage applied to the comparator. The varying pulse width signal causes the duty cycle for the control signal for the driver to vary. Initially, the reference voltage may be such that the duty cycle for the signal is a large percentage, such as a 100% duty cycle. After the elapse of a predetermined period of time, for example, one second, sufficient to allow the valve to change its position to a desired position, the reference voltage may be changed to a value which will yield a pulse width which will provide a lower duty cycle to the driver, thereby lowering the amount of energy dissipated in the valve. The reference utilized to generate the hold-in duty cycle for the signal can be obtained using a microprocessor such as Intel 87-C-196JR or KR, or Intel 8051PA under control of a feedback signal.

Note that feedback may be set up between the valve drivers 14 and 16 and the valve signal modulation controller 22. The feedback signal from the valve drivers 14 and 16 would provide a signal indicative of the actual control signal current being applied to the valves 10 and 12. This feedback signal would then be compared to a desired signal to achieve a preferred duty cycle.

The electronic brake management system of the present invention further includes a brushless motor and hydraulic pump, represented as the block 30 in the figure. The brushless motor in the block 30 may be implemented, by way of example, by a DC brushless motor or by a switched reluctance motor.

The brushless motor 30 is driven, by way of example, by three phase drivers and encoders 32. Information on the speed and position of the rotor in the brushless motor may be obtained using standard signal processing, or by means of Hall effect sensors. A signal indicative of the position and speed of the rotor is applied as a feedback signal to a motor signal modulation controller to thereby generate a motor speed control signal. In a preferred embodiment, the motor signal modulation controller may be implemented by the pulse width modulation circuit shown in block 22.

The purpose of the motor signal modulation controller is to reduce the speed of the brushless motor when it is appropriate, thereby reducing noise and vibration and providing other important advantages. The pulse width modulation circuit 22 may be used to accomplish this by altering the duty cycle of the signal applied to the brushless motor, thereby reducing the voltage applied to the motor. It is preferred that the pulse width modulation signal be approximately 20 kHz or greater to reduce the aforesaid noise and vibration. This switching decreases the average voltage applied to the motor in accordance with the duty cycle for the signal.

The use of a brushless motor is advantageous in that it allows the motor to operate over a much longer period without concern for reduced motor life due to brush wear. This is important in the present system where the motor is utilized to control the hydraulic pump driving the brake fluid every time the brake pedal is pushed.

As noted above, in order to control the speed of the brushless motor, it is essential to know the position of the rotor of the motor in order to provide current flow in the proper direction at the proper time to change the motor speed in the desired direction. The position of the rotor is sensed. The speed of the motor depends on the average voltage V and the load. For a given load and an average V, the speed-torque curve for the motor and the speed-torque curve for the load cross at the point where the motor will actually operate. By decreasing the average V, the motor is made to slow down. The motor speed control signal is generated by comparing a feedback signal from the motor, which signal is indicative of the speed of the motor, to a reference signal value. This reference signal value is determined, in the primary microcontroller 100, based on the fluid pressure required for a given set of variables, such as, for example, wheel speeds, pedal force, and vehicle sensors (YAW, acceleration, steering). This comparison may take place in a separate motor signal modulation controller, or it may be added as a function of the pulse width modulation block 22, or it may be added as a function of the primary microcontroller 100. The dashed line 40 between the three phase driver and encoder block 32 and the primary microcontroller block 100 is indicative of having this comparison performed in the primary microcontroller 100. Likewise, the line 42 between the three phase driver and encoders block 32 and the valve signal modulation controller 22 is indicative of having the comparison performed in the block 22. Note, in summary, that control of the motor involves not only reducing the average voltage by using pulse width modulation, but also commutating the various motor windings correctly so as to supply power to the motor effectively.

The proportional valves 18 are driven by the proportional valve drivers 20 based on the outputs of sensors that indicate the dynamics of the vehicle. For example, a set of sensors may indicate that a wheel is locking and generate an appropriate signal to change a reference signal which is then compared to the current value being applied to the proportional valves 18. This comparison of a reference signal set by the dynamics of the vehicle and the current provided by the proportional valves may occur in the primary microcontroller 100.

The present invention is set in the context of a primary microcontroller 100 which receives inputs from active wheel speed sensors 102 which may be conditioned via a hysteresis amplifier power and protection block 104, which protects against spikes and noise in the signal. The primary microcontroller 100 further receives inputs from local pressure sensor bridges which determine the pressure being applied to different brake lines. The local pressure sensor bridge information is applied via protection, amplifier and conditioning block 108 to the primary microcontroller 100. The block 108 again protects the primary microcontroller 100 from signal spikes. The primary microcontroller 100 further receives inputs from pedal position force sensors 110 via a protection, power and filter block 112. The pedal force sensors 110 provides an indication of how much force is being applied to the brake pedal and applies that signal through the protection, power and filter block 112 to remove spikes and noise from the signal. The primary microcontroller 100 also receives input signals from vehicle status sensors such as the acceleration sensors, the YAW sensor, and the steering sensor. These vehicle status sensors are represented by the block 114. The vehicle status sensor information is applied to the primary microcontroller 100 through a protection, power and filter block 116 which protects against spikes and filters out noise in the signal.

Finally, the primary microcontroller 100 receives inputs from various switches 118 such as the parking brake switch. Again information from the switches 118 is applied to the primary microcontroller 100 through a protection block 120 which protects against spikes from electrostatic discharges and the operation of other electrical equipment, such as turning the coil on and off or operating the solenoids or motors.

The primary microcontroller 100 may be implemented by a standard microcontroller chip such as the Intel 87C196JR or KR or the Intel 8051 FA. The algorithm that may be utilized to program the primary microcontroller is discussed in U.S. Provisional Patent Application Ser. No. 60/039,150, filed Feb. 21, 1997 entitled, "Electronic Brake Management and Brake by Wire Control Apparatus and Method" by the inventors, Andrew KINGSTON and Mark LUCKEVICH, with an attorney docket no. of 61233/4008. This patent application is hereby incorporated by reference into the present specification.

FIG. 1 further includes a failsafe microcontroller 122, which operates to determine that required sensors are operational. This failsafe microcontroller 122 exchanges data with the primary microcontroller 100 and generates a failsafe signal on line 24 to cause the system to become completely hydraulically controlled if one or more of these required sensors has a failure. This conversion of the system to a completely hydraulic system is accomplished by removing this failsafe signal on line 24 from a relay driver 126 to deactivate a relay 128. The relay 128 then removes power on line 130 in order to cause the valves 10, 12 and 18 to be completely hydraulically controlled. The power is supplied to the relay 128 by means of an unswitched line 129 from the battery.

This failsafe system further includes a watchdog sensor 132 for determining whether the failsafe microcontroller 122 is operational, and generating a signal on line 134 to deactivate the relay driver 126 upon the occurrence of a failure of the failsafe microcontroller 122.

A block 140 provides the vehicle power, for example, via a battery source. The output from the block 140 is provided to a voltage regulator 142, which provides the internal power level Vcc. The output power level from the voltage regulator 142 is also applied to a low voltage inhibit block 144. The low voltage inhibit block determines whether the voltage of the signal is above a predetermined threshold necessary to operate the voltage regulator 142 and the primary microcontroller 100. If the voltage of this signal is below the threshold, then the low voltage inhibit block 144 generates an inhibit signal on line 146 to inhibit various functions including the operation of the primary microcontroller 100 and the relay.

Finally, the system shown in FIG. 1 includes a block 150 which is representative of the vehicle and engine communication system. This is a communication interface or bus used for system control.

Figure 2:
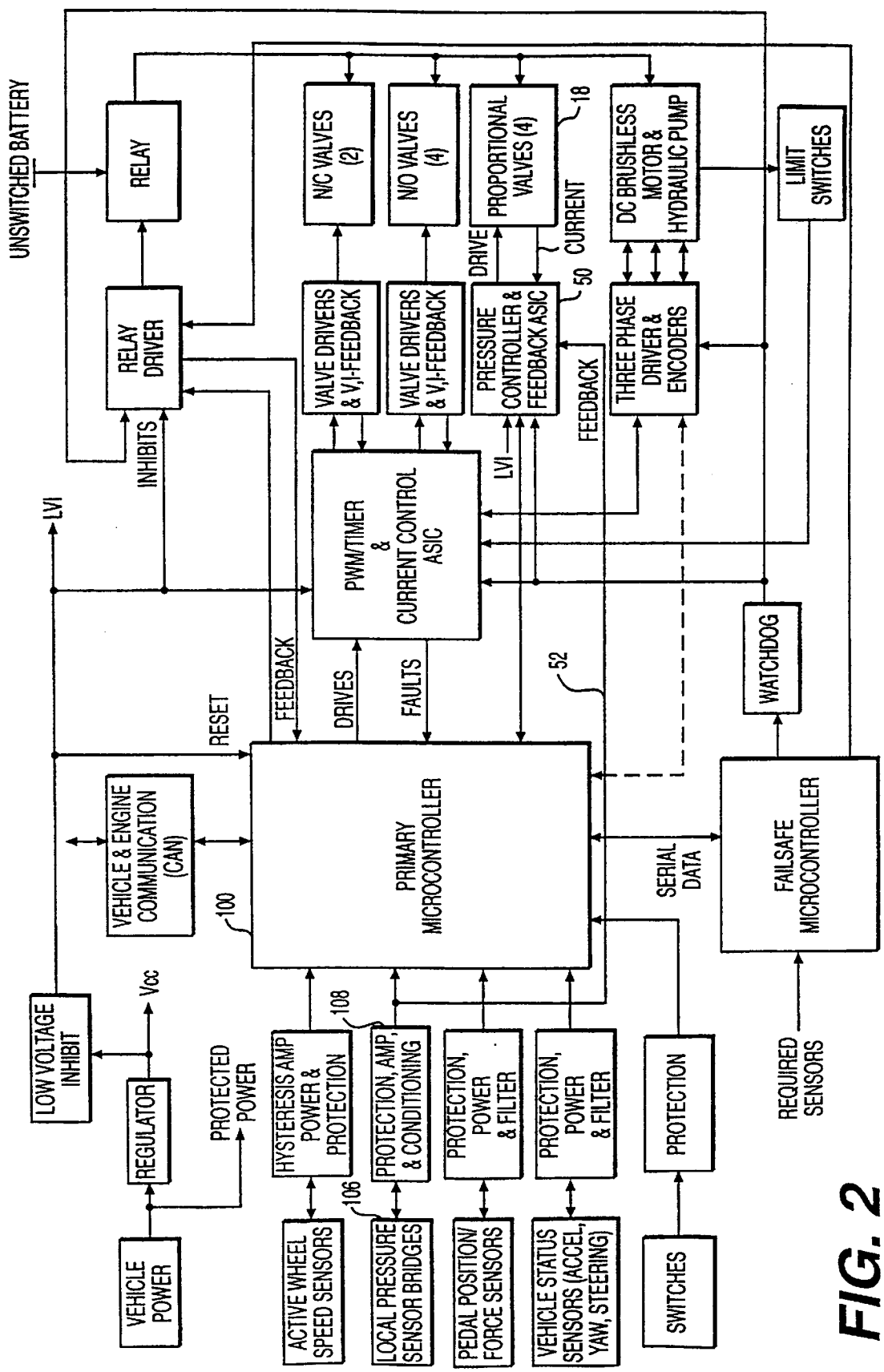
FIG. 2 is a schematic block diagram of a second preferred embodiment of the present invention.

FIG. 2 is identical to FIG. 1 except that a smart controller, conveniently implemented by an ASIC chip, 50 is substituted for the proportional drive block 20. Block 50 has direct communication with the primary controller 100 and takes a direct input signal from the local pressure sensor bridges 106 via a line 52. The purpose of this design is to offload some of the processing function from the primary microcontroller 100 to thereby alleviate bandwidth/speed problems that occur when inexpensive microcontrollers are utilized. Accordingly, in FIG. 2 the information from the local pressure sensor bridges relating to the pressure in the different brake lines is utilized to provide a control signal on line 52 to be compared, either directly or indirectly, with the pressure requested by the primary microcontroller. There may be another feedback loop with a feedback signal indicative of the current being applied to the proportional valves 18. Thus, if a signal is applied from the local pressure sensor bridges 106 which, in conjunction with wheel speed signals, is indicative that one of the wheels is locking, then the pressure controller 50 will receive that information via the lines 52 and will generate a signal to control the amount of current in the drive signal to the appropriate signal valve to control braking for that wheel and the vehicle.

Obviously many modifications and variations of the present invention are possible in light of the above teachings. Is therefore, to be understood that within the scope of the appended claims, the invention may be practiced otherwise than as specifically described.

What is claimed is:

1. An electronic brake management system for controlling the application of brakes to wheels on a vehicle, comprising:
   a plurality of hydraulic valves for controlling the application of brakes to said wheels on said vehicle;
   a plurality of valve drivers for controlling different ones of said valves in accordance with respective electrical valve control signals for said plurality of valves;
   a valve signal modulation controller for applying said electrical valve control signals to said valve drivers, wherein said electrical control signal for an associated valve is modulated to reduce the amount of electrical power supplied thereby once the valve associated therewith has changed to a desired flow position;
   a motor signal modulation controller for generating a motor position control signal;
   a brushless motor for driving a hydraulic pump for supplying fluid to said brakes in accordance with said motor position control signal from said motor signal modulation controller, said brushless motor providing a feedback signal to said motor signal modulation controller indicative of the position of said brushless motor rotor, wherein said motor signal modulation controller controls the speed of said brushless motor via said motor position control signal.

2. A brake management system as defined in claim 1, wherein said valve signal modulation controller is a pulse width modulator.

3. A brake management system as defined in claim 1, wherein said brushless motor is a DC brushless motor.

4. A brake management system as defined in claim 1, wherein said brushless motor is a switched reluctance motor.

5. A brake management system as defined in claim 1, further comprising at least one proportional valve;
   at least one proportional valve driver for driving said at least one proportional valve; and
   a proportional valve signal modulation controller for generating a proportional valve control signal to control said at least one proportional valve driver.

6. A brake management system as defined in claim 1, wherein said motor signal modulation controller is a pulse width modulator.

7. A brake management system as defined in claim 1, wherein said motor signal modulation controller is a pulse width modulator operating at approximately 20 kHz or greater.

8. A brake control system as defined in claim 1, wherein said valve signal modulation controller and said motor signal modulation controller are comprised by a pulse width modulation circuit.

9. A brake management system as defined in claim 1, wherein said plurality of valve drivers generate feedback signals to said valve signal modulation controller, which feedback signals are indicative of the said electrical control signals applied to said valves.

10. An electronic brake management system for controlling the application of brakes to wheels on a vehicle, comprising:
    a plurality of hydraulic valves for controlling the application of brakes to said wheels on said vehicle;
    a plurality of valve drivers for controlling said valves in accordance with respective first PWM control signals for said plurality of valves;
    a plurality of proportional valves;
    a plurality of proportional valve drivers for controlling said proportional valves in accordance with respective second PWM electrical control signals;
    a brushless motor for driving a hydraulic pump for supplying fluid to said brakes in accordance with a motor position PWM control signal; and
    a pulse width modulation circuit for receiving feedback signals from said plurality of proportional drivers indicative of a parameter of said respective ones of said plurality of proportional valves, and for receiving a feedback signal indicative of the position of said brushless motor, and generating said first PWM control signals, said second PWM control signals, and said motor speed PWM control signal.

11. A brake management system as defined in claim 10, wherein said motor position PWM control signal operates at approximately 20 kHz or greater.

12. A method for controlling brake fluid to brakes associated with wheels on a vehicle, comprising the steps of:
    controlling hydraulic valves that apply brake fluid to respective brakes in accordance with a modulated valve control signal;
    controlling the speed of a brushless motor that drives a hydraulic pump for supplying the fluid to said brakes in accordance with a motor position control signal; and
    generating said motor speed control signal in accordance with a feedback signal indicative of the position of said brushless motor.

13. A method as defined in claim 12, wherein said motor speed control generating step comprises the step of generating a pulse width modulated signal as said motor speed control signal, and wherein the step of controlling said hydraulic valves comprises the step of generating a pulse width modulated signal as said motor speed control signal.

14. A method as defined in claim 12, further comprising the step of generating said pulse width modulated signal for controlling said hydraulic valves in accordance with a signal generated based on a comparison of said pulse width modulated signal to a reference signal.

15. A method as defined in claim 12, further comprising the step of controlling a proportional hydraulic valve in accordance with a pulse width modulated signal generated based on a comparison of a feedback signal from a proportional valve driver and a reference signal.

16. A method as defined in claim 12 wherein said motor speed control generating step comprises the step of generating a pulse width modulated signs at a frequency of approximately 20 kHz or above as said motor speed control signal.

* * * * *

UNITED STATES PATENT AND TRADEMARK OFFICE
CERTIFICATE OF CORRECTION

PATENT NO. : 6,206,482 B1
DATED : March 27, 2001
INVENTOR(S) : Gregory P. Campau, et al.

It is certified that error appears in the above-identified patent and that said Letters Patent is hereby corrected as shown below:

Claim 1, column 6,
Line 15, after the word "signal;" insert -- and --;
Line 16, after the word "motor" insert -- having a rotor --.

Claim 9, column 7,
Line 4, delete [the].

Claim 10, column 7,
Line 12, delete [electrical];
Line 12, after the word "signals" insert -- , said plurality of proportional valve drivers generating feedback signals indicative of a parameter of respective ones of said plurality of proportional valves --;
Line 15, delete [position] and insert -- speed --;
Line 15, after the word "signal" delete [; and] and insert -- said brushless motor generating a feedback signal indicative of the position of said brushless motor; and --;
Line 16, after the word "receiving" insert -- said --;
Line 17, after the word "drivers" insert a -- , -- and delete [indicative of a parameter of said respective ones of said plurality of proportional valves, and];

Column 8,
Line 1, delete [a] and insert -- said --;
Line 3, after the word "and" insert -- for --

UNITED STATES PATENT AND TRADEMARK OFFICE
CERTIFICATE OF CORRECTION

PATENT NO.   : 6,206,482 B1
DATED        : March 27, 2001
INVENTOR(S)  : Gregory P. Campau, et al.

It is certified that error appears in the above-identified patent and that said Letters Patent is hereby corrected as shown below:

Claim 11, column 8,
Line 2, delete [position] and insert -- speed --.

Claim 13, column 8,
Line 6, delete [motor speed] and insert -- modulating valve --.

Claim 16, column 8,
Line 3, delete [signs] and insert -- signal --.

Signed and Sealed this

Eighteenth Day of September, 2001

Attest:

NICHOLAS P. GODICI
*Attesting Officer*  *Acting Director of the United States Patent and Trademark Office*